(12) United States Patent
Ma et al.

(10) Patent No.: US 11,748,453 B2
(45) Date of Patent: Sep. 5, 2023

(54) CONVERTING UNSTRUCTURED COMPUTER TEXT TO DOMAIN-SPECIFIC GROUPS USING GRAPH DATASTRUCTURES

(71) Applicant: International Business Machines Corporation, Armonk, NY (US)

(72) Inventors: Yi-Hui Ma, Mechanicsburg, PA (US); Iman Johari, Coquitlam (CA); Vyoma Gajjar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 445 days.

(21) Appl. No.: 17/177,620

(22) Filed: Feb. 17, 2021

(65) Prior Publication Data

US 2022/0261602 A1   Aug. 18, 2022

(51) Int. Cl.
| | | |
|---|---|---|
| *G06F 40/20* | (2020.01) | |
| *G06F 40/211* | (2020.01) | |
| *G06F 40/30* | (2020.01) | |
| *G06F 18/20* | (2023.01) | |
| *G06F 18/2135* | (2023.01) | |
| *G06F 18/23213* | (2023.01) | |

(Continued)

(52) U.S. Cl.
CPC ........ *G06F 18/24137* (2023.01); *G06F 18/22* (2023.01); *G06F 18/23* (2023.01); *G06F 40/205* (2020.01); *G06N 20/00* (2019.01)

(58) Field of Classification Search
USPC ............. 382/128–225; 706/934, 1–62; 707/705–800
See application file for complete search history.

(56) References Cited

U.S. PATENT DOCUMENTS

| | | | |
|---|---|---|---|
| 7,711,668 B2 * | 5/2010 | Brinker | G06F 16/353 706/45 |
| 10,176,251 B2 | 1/2019 | Boule et al. | |

(Continued)

OTHER PUBLICATIONS

Ananthanarayanan et al., "Unstructured Information Integration Through Data-Driven Similarity Discovery" Workshop on Information Integration on the web, (Year: 2009), 6 pages.

(Continued)

*Primary Examiner* — Marcellus J Augustin
(74) *Attorney, Agent, or Firm* — Cantor Colburn LLP; Stosch Sabo (57) ABSTRACT

Technical solutions are described for improving the performance of natural language processing systems and other such human-computer interaction systems by facilitating analyzing unstructured computer text by converting such unstructured computer text to domain-specific groups using network graphs. The technical solutions use a graph to connect similar terms with attributes and structural information to facilitate the grouping of different terms that may be used to describe the same entity. Technical solutions facilitate analyzing different input data to generate a graph that can be further used to find data similarity in the input data. The generated graph captures attributes associated with each term and assigns groupings for all the terms at the same time, improving the performance of the natural language processing (NLP) system that is analyzing the input data.

20 Claims, 7 Drawing Sheets

(51) Int. Cl.
*G06F 18/24* (2023.01)
*G06F 18/2413* (2023.01)
*G06F 40/205* (2020.01)
*G06N 20/00* (2019.01)
*G06F 18/22* (2023.01)
*G06F 18/23* (2023.01)

(56) References Cited

U.S. PATENT DOCUMENTS

| | | | |
|---|---|---|---|
| 10,318,564 | B2 | 6/2019 | Chalabi et al. |
| 10,373,058 | B1 | 8/2019 | Ben-Natan et al. |
| 10,394,799 | B2 | 8/2019 | Geigel et al. |
| 10,437,833 | B1* | 10/2019 | Nguyen ............... G06N 5/041 |
| 10,540,512 | B2 | 1/2020 | Gschwind et al. |
| 10,614,100 | B2* | 4/2020 | Khapra ............... G06N 5/022 |
| 10,628,471 | B2 | 4/2020 | Chandramouli |
| 10,789,296 | B2* | 9/2020 | Trim ............... G06N 20/00 |
| 11,663,254 | B2* | 5/2023 | Conrad ............... G06F 16/355 |
| | | | 707/728 |
| 2005/0234973 | A1* | 10/2005 | Zeng ............... G06N 5/02 |
| 2010/0169318 | A1* | 7/2010 | Thompson ............... G06F 16/957 |
| | | | 707/E17.046 |
| 2011/0307477 | A1 | 12/2011 | Dasari et al. |
| 2012/0185935 | A1 | 7/2012 | Bestgen et al. |
| 2016/0063590 | A1* | 3/2016 | Subramanya ...... G06Q 30/0623 |
| | | | 705/26.61 |
| 2016/0132515 | A1* | 5/2016 | Rajaraman ............ G06F 16/283 |
| | | | 707/741 |
| 2017/0075904 | A1 | 3/2017 | Hedges |
| 2018/0101561 | A1* | 4/2018 | Ganjam ................ G06F 16/285 |
| 2019/0102455 | A1 | 4/2019 | Radhakrishnan et al. |
| 2019/0340240 | A1 | 11/2019 | Duta et al. |
| 2020/0226288 | A1 | 7/2020 | Zhang et al. |
| 2020/0250249 | A1* | 8/2020 | Fedoryszak ......... G06F 16/9538 |
| 2022/0114346 | A1* | 4/2022 | Galitsky ................ G16H 50/20 |

OTHER PUBLICATIONS

Varghese et al., "Lexical and semantic analysis of sacred texts using Machine Learning and Natural Languages Processing" IJSTR, vol. 8 (12), Dec. 2019, (Year: 2019), pp. 3133-3140.

Vijayarani et al.; "Preprocessing Techniques for Text Mining—An Overview", IJCSC, vol. 5 (1), Mar. 2014, pp. 7-16.

Wick et al., "Learning Field Compatibilities to Extract Database Records from Unstructured Text" EMNLP/WS Conference, Jul. 2006 (Year: 2006), pp. 603-611.

* cited by examiner

FIG. 2

| String Analytic Unit | Input | Parameter |
|---|---|---|
| Special Characters Handling | Individual-string | Special characters to be processed |
| Abbreviation Expander | Individual-string | Mapping of Abbreviation |
| Common Term Removal | Individual-string | Terms to be removed |
| String Normalization | Individual-string | Normalized Format |
| Phonetic Transformation | Individual-string | Algorithm |
| Character Count | Individual-string | Exclusion Criteria |
| Word Count | Individual-string | Exclusion Criteria |
| Upper/Lower Cases Conversion | Individual-string | Upper or Lower |
| Tokenization | Individual-string | Token Definition |
| Binning | Individual-string | Algorithm |
| Look up Table Mapping | Individual-string | Source of table |
| Character Similarity | Pair-of-strings | Algorithm |
| Word Similarity | Pair-of-strings | Algorithm |
| List sorting | List-of-strings | Sorting key |
| Frequency Count | List-of-strings | Cutoff threshold |

CONVERTING UNSTRUCTURED COMPUTER TEXT TO DOMAIN-SPECIFIC GROUPS USING GRAPH DATASTRUCTURES

BACKGROUND

The present invention generally relates to programmable computers, specifically improving the performance of natural language processing systems and other such human-computer interaction systems by facilitating analyzing unstructured computer text by converting such unstructured computer text into domain-specific groups using graph datastructures.

Human-computer interaction necessitates natural language processing (NLP), in which a computer captures meaning from unstructured text, such as documents, text, speech, etc. However, many NLP challenges involve natural language understanding, i.e., enabling the computers to derive meaning from human or natural language input. In some cases, natural languages describe entities and activities and their relationship to each other. Whether someone is describing a complex business transaction, the latest episode of a television drama, or a sporting event, the description includes entities and activities or objects and events that occurred/are occurring. On the other hand, computer languages and data structures are designed to describe logic, processes, and algorithms. Computer systems execute computer programs developed using such languages to apply statistical models, search and discover the data, and display results to a user in a variety of formats. However, much of the data that humans create is unstructured. Some estimates indicate that unstructured text accounts for approximately 70-90% of most organizations' data. Yet, few tools allow computer systems to have a deep understanding of what such text describes.

SUMMARY

According to one or more embodiments of the present invention, a computer-implemented method for converting unstructured computer text to domain-specific groups includes determining a plurality of data-streams in an input text by parsing the input text. The method further includes computing, for each pair of data-streams from the plurality of data-streams, a similarity score based on an input that identifies a domain of the input text. The method further includes generating one or more graph data structures that comprise a plurality of nodes, each node representing a respective data-stream from the plurality of data-streams, and wherein the one or more graph data structures further comprise a plurality of edge, wherein an edge is added between a pair of nodes based on the similarity score of the corresponding pair of data-streams being above a first predetermined threshold. The method further includes associating each node with one or more attributes based on the data-stream corresponding to each node. The method further includes determining one or more clusters of nodes in the one or more graph data structures, wherein a cluster is determined by a clustering algorithm based on the one or more attributes of the nodes. The method further includes determining a centroid of each of the one or more clusters of nodes. The method further includes categorizing the clusters of nodes into one or more predetermined groups that are specific to the domain of the input text by categorizing the data-stream corresponding to the centroids of the respective clusters of nodes. The method further includes aggregating two or more clusters of nodes categorized into the same predetermined group in response to a similarity score of the centroids of the two or more clusters of nodes exceeding a second predetermined threshold. The method further includes assigning each of the data-streams from the input text to the predetermined groups.

Other embodiments of the present invention implement features of the above-described method in computer systems and computer program products.

A system includes a memory, and one or more processors for executing computer-readable instructions stored on the memory, the computer-readable instructions controlling the one or more processors to perform a computer-implemented method for converting unstructured computer text to domain-specific groups includes determining a plurality of data-streams in an input text by parsing the input text. The method further includes computing, for each pair of data-streams from the plurality of data-streams, a similarity score based on an input that identifies a domain of the input text. The method further includes generating one or more graph data structures that comprise a plurality of nodes, each node representing a respective data-stream from the plurality of data-streams, and wherein the one or more graph data structures further comprise a plurality of edge, wherein an edge is added between a pair of nodes based on the similarity score of the corresponding pair of data-streams being above a first predetermined threshold. The method further includes associating each node with one or more attributes based on the data-stream corresponding to each node. The method further includes determining one or more clusters of nodes in the one or more graph data structures, wherein a cluster is determined by a clustering algorithm based on the one or more attributes of the nodes. The method further includes determining a centroid of each of the one or more clusters of nodes. The method further includes categorizing the clusters of nodes into one or more predetermined groups that are specific to the domain of the input text by categorizing the data-stream corresponding to the centroids of the respective clusters of nodes. The method further includes aggregating two or more clusters of nodes categorized into the same predetermined group in response to a similarity score of the centroids of the two or more clusters of nodes exceeding a second predetermined threshold. The method further includes assigning each of the data-streams from the input text to the predetermined groups.

According to one or more embodiments of the present invention, a computer program product includes a computer-readable storage medium having program instructions embodied therewith. The program instructions are executable by one or more processors to cause the one or more processors to perform a method for converting unstructured computer text to domain-specific groups includes determining a plurality of data-streams in an input text by parsing the input text. The method further includes computing, for each pair of data-streams from the plurality of data-streams, a similarity score based on an input that identifies a domain of the input text. The method further includes generating one or more graph data structures that comprise a plurality of nodes, each node representing a respective data-stream from the plurality of data-streams, and wherein the one or more graph data structures further comprise a plurality of edge, wherein an edge is added between a pair of nodes based on the similarity score of the corresponding pair of data-streams being above a first predetermined threshold. The method further includes associating each node with one or more attributes based on the data-stream corresponding to each node. The method further includes determining one or more clusters of nodes in the one or more graph data structures, wherein a cluster is determined by a clustering algorithm based on the one or more attributes of the nodes. The method further includes determining a centroid of each of the one or more clusters of nodes. The method further includes categorizing the clusters of nodes into one or more predetermined groups that are specific to the domain of the input text by categorizing the data-stream corresponding to the centroids of the respective clusters of nodes. The method further includes aggregating two or more clusters of nodes categorized into the same predetermined group in response to a similarity score of the centroids of the two or more clusters of nodes exceeding a second predetermined threshold. The method further includes assigning each of the data-streams from the input text to the predetermined groups.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Embodiments of the present invention facilitate improving natural language processing systems and other such human-computer interaction systems by facilitating analyzing unstructured computer text by converting such unstructured computer text to domain-specific groups using network graphs. One or more embodiments of the present invention use a graph to connect similar terms with attributes and structural information to facilitate the grouping of different terms that may be used to describe the same entity. In other words, one or more embodiments of the present invention facilitate analyzing different input data to generate a graph that can be further used to find data similarity in the input data. The generated graph captures attributes associated with each term. It assigns groupings for all the terms simultaneously, improving the performance of the natural language processing (NLP) system that is analyzing the input data.

Figure 1:
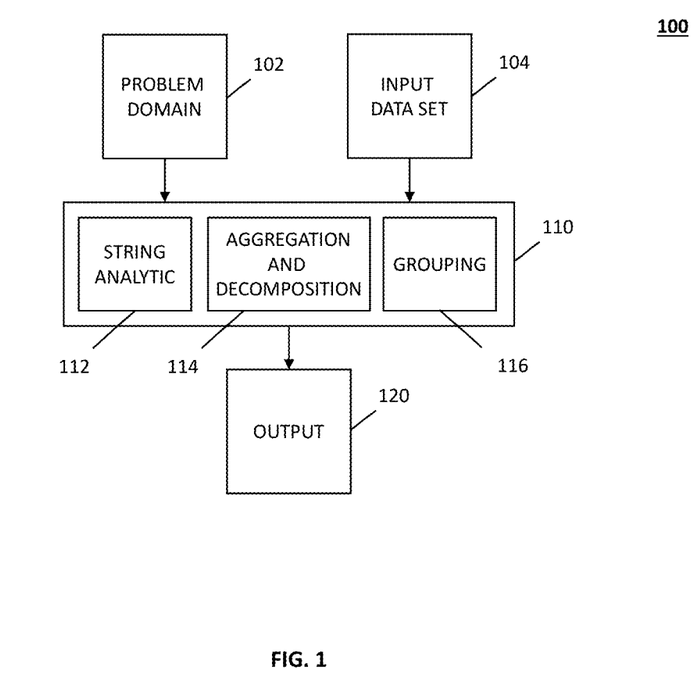
FIG. 1 depicts a block diagram of a system for converting unstructured computer text to domain-specific groups using graphs according to one or more embodiments of the present invention.

FIG. 1 depicts a block diagram of a system for converting unstructured computer text to domain-specific groups using graphs according to one or more embodiments of the present invention. The depicted system 100 includes certain information being provided as input. Such input includes the problem domain 102, which may include a specific problem, issue, or task that a user provides as context to be used when mining for information in the input dataset 104. In some embodiments of the present invention, the problem domain 102 also includes the general area or field of the specific problem, issue, or task. In some embodiments of the present invention, the problem domain 102 includes one or more keywords related to the specific problem, issue, or task. For example, the problem domain 102 can indicate that the input dataset 104 contains text that is related to financial information, sports information, weather information, historical information, or any other such contextual information that can be used to analyze the text.

Additionally, the system 100 includes the input dataset 104 that is to be analyzed. In some embodiments, the input dataset 104 is a collection of information that the user has identified as being relevant to the problem domain 102. In some embodiments, the input dataset 104 is a collection of data available to a user, whether relevant to the problem domain 102 or not. In some embodiments, the input dataset 104 is a combination of information provided by a user and information provided by one or more third parties, such as an external data store, public domain information, or information provided by an analytical system. For example, for problem domains related to financial transactions, the input dataset 104 can contain transactional records, contact numbers, account numbers, transaction ID, transaction amounts, currencies, and more.

Once the problem domain 102 and the input dataset 104 are inputted, a text processing system 110 analyzes the provided information. The text processing system 110 generates, in light of the problem domain 102 and the input dataset 104, an output 120. The text processing system 110, according to one or more embodiments of the present invention, facilitates a technical solution to organize several unstructured text fields/terms in the input dataset 104 using a list of strings/terms (e.g., classifications). As used herein, and unless stated otherwise, a "string" is a data-stream, and can include a sequence of alphanumeric characters, and can include one or more characters, words, numbers, or a combination thereof. Organizing several such data-streams that are contained in the input dataset 104 includes grouping the data-streams using a semantic model. A "group" is a set of concepts/terms which have either taxonomic or non-taxonomic relationships among them. Accordingly, the output 120 provides an ontology for the problem domain 102 based on the input dataset 104.

In one or more embodiments of the present invention, the semantic model is based on the similarity of terms in the data-streams based on domain-specific requirements. The domain-specific requirements are determined based on the problem domain 102. As will be apparent to a person skilled in the art, the technical solutions described herein facilitate improvements to the analytic data quality of the text processing system 110. Further, the technical solutions described herein reduce manual preprocessing for unstructured text fields/terms in the input dataset 104. It should be noted that the input dataset 104 includes a large corpus of unstructured text, for example, 100+ millions of data-streams, and analyzing the input dataset 104 manually is impractical, if not impossible.

The text processing system 110, using the technical solutions described herein, generates an output 120, which includes the analysis results. The results include one or more terms that are identified in the input dataset 104, with such identified terms being organized to demonstrate similarities among the identified terms. According to one or more embodiments of the present invention, the terms are organized as a graph, with the determined similarities being used to generate the graph.

In one or more embodiments of the present invention, the "terms" identify named text features in the input dataset 104, for example, people, organizations, place names, stock ticker symbols, certain abbreviations, and so on. A detected combination of characters in the input dataset 104 is determined to be a "term" based on the problem domain 102 that is input. For example, if the problem domain 102 is financial information, the word "chase" may be referring to the financial institution that has that word in its name and has to be further investigated to determine whether it is a "term." Instead, if the problem domain 102 is sports information, the same word, "chase" may be referring to one player chasing another, or a team chasing another team's score, etc., and hence, not a "term." It is understood that the above are exemplary scenarios and that in one or more embodiments of the present invention, various other exemplary scenarios are possible.

The text processing system 110 includes, among other components, a string analytic unit 112, an aggregation and decomposition unit 114, and a grouping unit 116. It is understood that these, and any other names of units/modules/components that are used here can be replaced with other names without substantial change in the provided functionality/operations. The operations performed by the analytic unit 112, the aggregation and decomposition unit 114, and the grouping unit 116 are described further herein.

Figure 2:
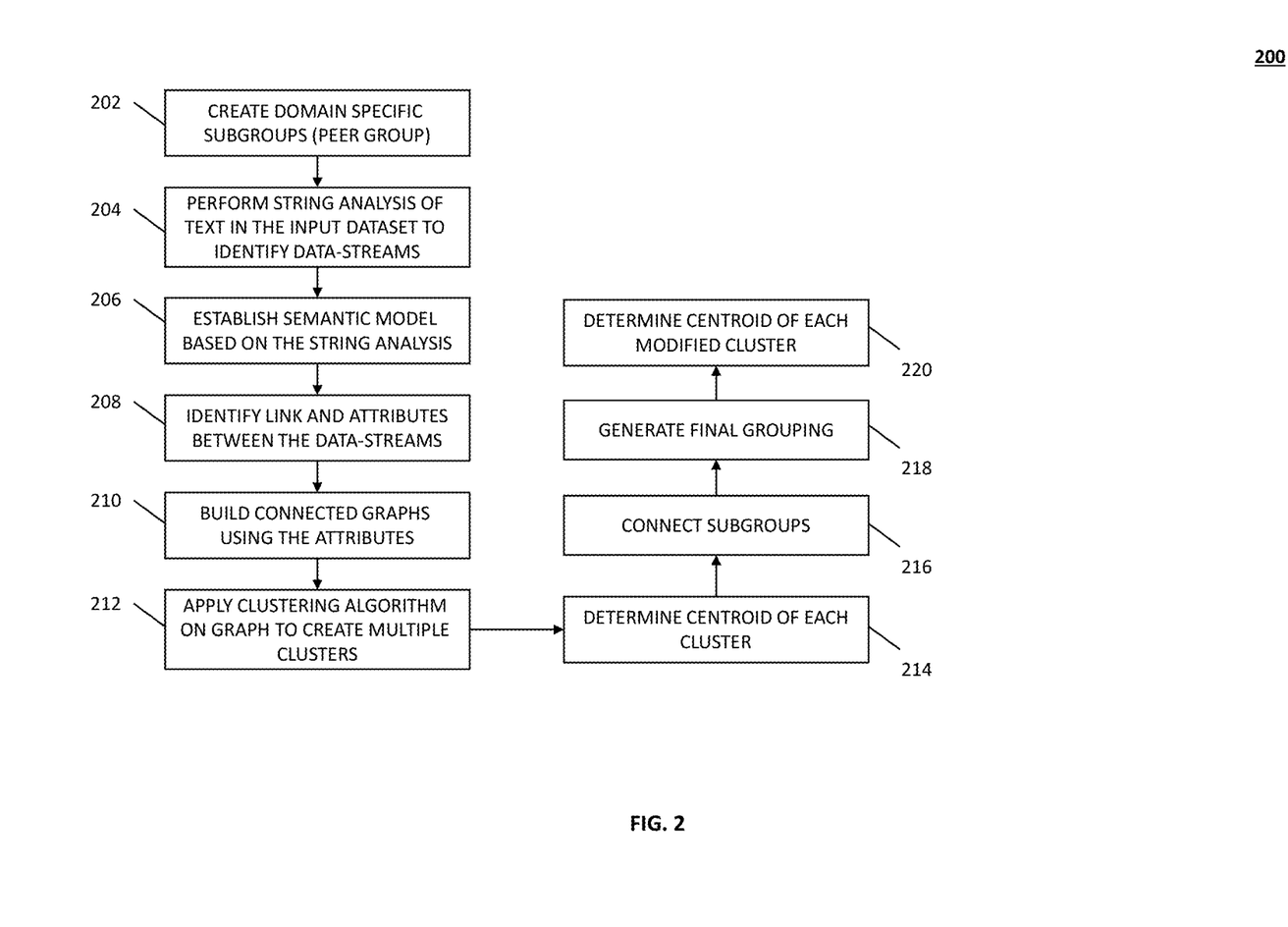
FIG. 2 depicts a flowchart of a method for converting unstructured computer text to domain-specific groups using graphs according to one or more embodiments of the present invention.

FIG. 2 depicts a flowchart of a method for converting unstructured computer text to domain-specific groups using graphs according to one or more embodiments of the present invention. The depicted method 200 is implemented by the system 100. The method 200 includes creating one or more domain-specific subgroups for the input dataset 104, at block 202. Domain-specific subgroups can represent a set of concepts (features/relationships), where one concept (feature/relationship) can be used in place of another from that set. In one or more embodiments, the domain-specific subgroups are generated based on one or more domain-specific glossaries (or dictionaries) for the problem domain 102.

Figure 3:
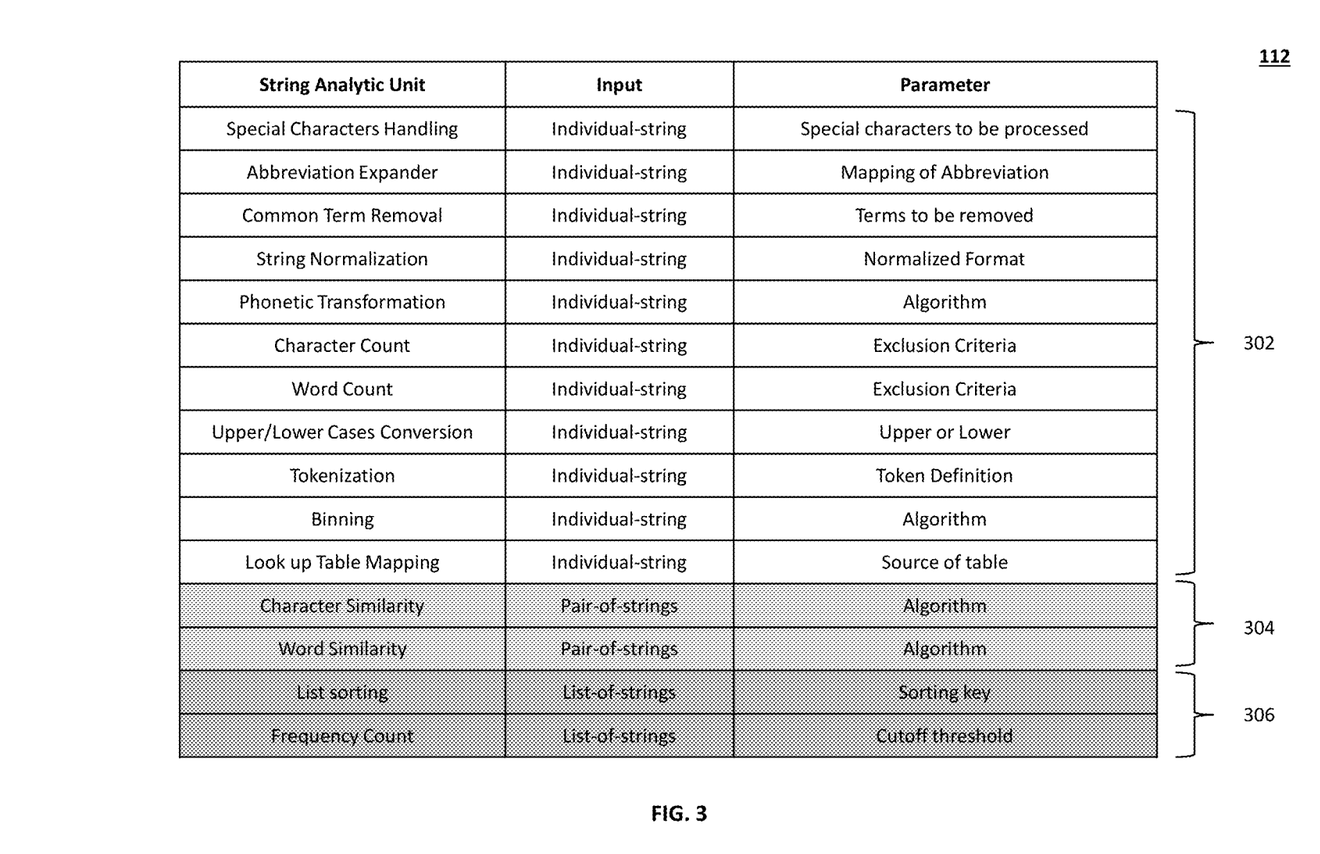
FIG. 3 depicts an example s of string analytic modules according to one or more embodiments of the present invention.

Further, the text in the input dataset 104 is syntactically analyzed to identify one or more data-streams in the input dataset 104 using the string analytic unit 112, at block 204. The string analytic unit 112 can include several string analytic modules. FIG. 3 depicts examples of string analytic modules that can be used to analyze the text in the input dataset 104. Each string analytic module can perform a corresponding function(s) based on one or more parameters and the input text that is parsed from the input dataset 104. The string analytic unit 112 includes individual-string based analytic modules 302. The individual-string analytic modules 302 operate on individual data-streams based on the parameters that are provided as input. For example, individual-string analytic modules 302 include a module to handle special characters, such as "$," "@," etc., that can occur when parsing the text. The individual-string analytic modules 302 can further include modules to expand an abbreviation, remove particular term(s), count characters, count words, convert capitalization, etc. The individual-string analytic modules 302 provide attributes information associated with each data-stream, for example, number of characters, number of words, alternative data-stream, etc. It should be noted that the above, and those depicted in FIG. 3, are just a few examples of individual-string analytic modules 302 and that in one or more embodiments of the present invention, several other individual-string analytic modules 302 can be used.

Further, at block 206, the results from the string analytic unit 112 are used to establish a semantic model for the input dataset 104. The semantic model can establish relationships between two or more of the data-streams that have been identified in the input dataset 104 and have been analyzed using the string analytic unit 112. Generating the semantic model can be performed using any of the techniques that are known or will be known in the future.

Further, at block 208, links are detected between the data-streams that are identified and analyzed. The links can be detected using pair-of-string modules 304 from the string analytic unit 112. The pair-of-string modules 304 operate on two data-streams to compare the two data-streams based on the one or more attributes of the two data-streams. For example, the pair-of-string modules 304 can provide character similarity in the input pair of strings, which indicates how many characters are common in the two strings. Further, the pair-of-string modules 304 can provide a word similarity that indicates how many similar words are in the two data-streams. Here, "similar words" can include the same words, synonyms, or other strings that can be considered to be replaceable. It should be noted that the above, and those depicted in FIG. 3, are just a few examples of pair-of-string modules 304 and that in one or more embodiments of the present invention, several other pair-of-string modules 304 can be used.

In one or more embodiments of the present invention, a similarity score is computed for each pair of data-streams using the pair-of-string modules 304. The similarity score can use the character similarity, semantic similarity, and other such attributes to determine the similarity score. It is understood that other attributes of the data-streams can be used to determine the similarity score between a pair of data-streams.

Further, at block 210, graph data structures are constructed using all of the identified data-streams. The graph data structures are constructed based on the links and attributes that are determined for the data-streams. A graph is constructed by adding a node corresponding to a respective data-stream and adding an edge to another node if the similarity score between the two data-streams corresponding to the two nodes is above a predetermined threshold. It should be noted that the construction of the graph data structures is performed using a computer system because of the amount of data that has to be processed, such as 100+ million data-streams. It can be impractical, if not impossible, to construct such a graph manually.

Figure 4:
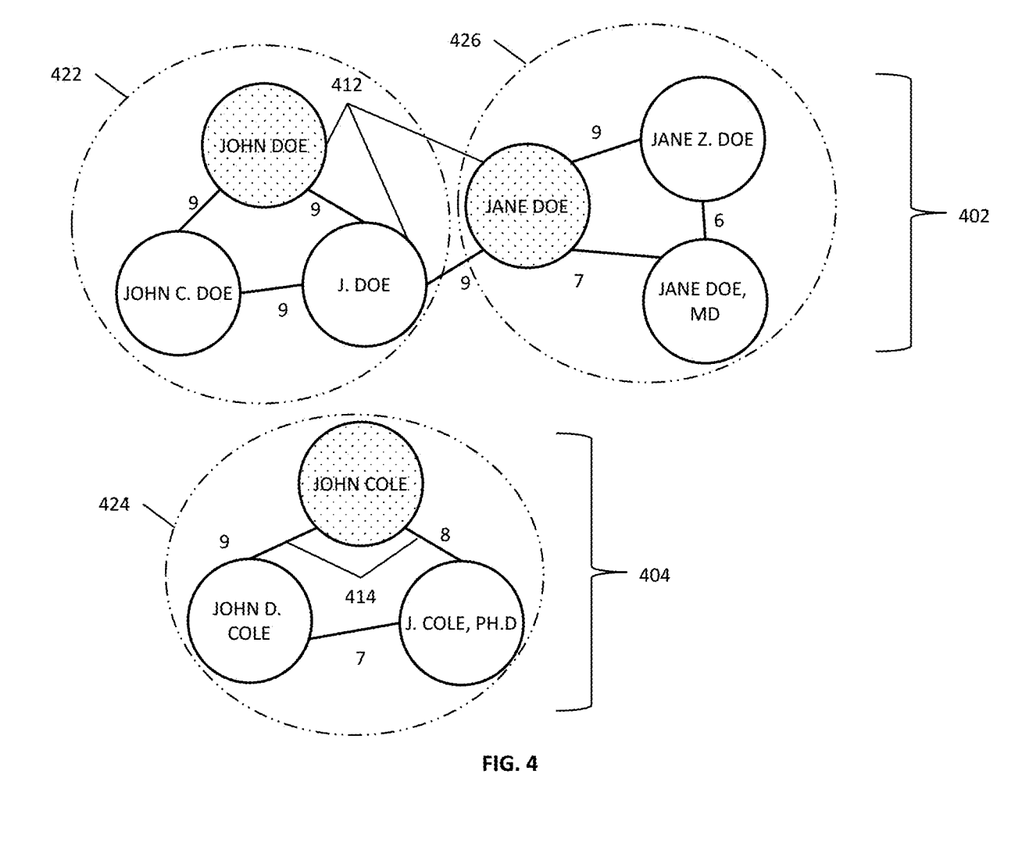
FIG. 4 depicts example graph data structures generated by one or more embodiments of the present invention.

FIG. 4 depicts an example of graph data structures that are constructed according to one or more embodiments of the present invention. It is understood that although only two graph data structures 402, 404 are shown, in one or more embodiments of the present invention, a different number of graph data structures can be created. Further, each of the two graph data structures 402, 404 are shown to include three nodes 412 with edges 414. Each of the edge 414 has a weight associated with it based on the similarity score of the data-streams corresponding to the two nodes 412 connected by that edge 414. It is understood that the shown weights are exemplary and that in one or more embodiments of the present invention, the weight values can be different from those shown here.

Referring to the flowchart in FIG. 2, at block 212, a clustering algorithm is applied to the graph structure to categorize the nodes into multiple clusters. For example, a clustering algorithm such as Highly Connected Clusters (HCS), Markov Clustering Algorithm (MCL), or any other such algorithm is used that creates the clusters based on the links and the attributes associated with the edges and nodes in the graph. The clustering algorithm can determine multiple clusters within a single graph data structure.

For example, referring to FIG. 4, two clusters 422, 426 are determined in the graph data structure 402, while only a single cluster 424 is determined in the graph data structure 404. It is understood that the number of clusters determined in a graph data structure can vary based on several factors, including but not limited to the clustering algorithm used, the input dataset 104, etc., that are used in one or more embodiments of the present invention.

Referring to FIG. 2 again, the flowchart further includes, at block 214, determining a centroid of each cluster 422, 424, 426. The centroid of cluster 422 can be determined based on the attributes of the data-streams in that cluster 422. In one or more embodiments of the present invention, the individual-strings modules 302, the list-of-string modules 306, and/or the pair-of-strings modules 304 from the string analytic unit 112 can be used to determine the attributes to be used to determine the centroid. The list-of-strings modules 306 operate on a list of data-streams from the input dataset 104. For example, the list-of-string modules 306 can provide sorting a list of strings. Additionally, the list-of-string modules 306 can provide a frequency of a character, a word, or a data-stream in a list of strings. It should be noted that the above, and those depicted in FIG. 3, are just a few examples of list-of-string modules 306 and that in one or more embodiments of the present invention, several other list-of-string modules 306 can be used.

FIG. 4 depicts the designated centroid nodes in the example scenario by shading such centroid nodes.

In method 200, at block 216, the clusters 422, 424, 426 that are created are connected, using the respective centroids, with the domain-specific subgroups that were identified earlier. The data-stream corresponding to the centroid is categorized into one of the subgroups based on the problem-domain 102. In one or more embodiments of the present invention, the data-stream is categorized into one of the predefined subgroups using the semantic model.

Further, at block 218, the final grouping is generated by aggregating data-streams that are categorized in the same subgroup. The aggregation is performed by using the pair-of-strings modules 304 on the data-streams in a single subgroup. It should be noted that the data-streams in the single subgroup are all centroid-data-streams, i.e., data-streams corresponding to centroids. Each of the subgroups is analyzed in this manner using the pair-of-strings modules 304. If the similarity score between two centroid-data-streams in the subgroup exceeds a predetermined threshold, the two clusters corresponding to the centroid-data-streams are combined into a single cluster. The predetermined threshold used at this stage can be different from the predetermined threshold that was used when constructing the graph data structures.

At block 220, for any of the clusters that are modified because of the combining, a new centroid node is determined of the combined cluster. All of the nodes in the cluster are associated with the new centroid node and, in turn, the corresponding data-stream of the new centroid node. This association can include adding edges from the nodes in the cluster to the new centroid node. Accordingly, the group centroid data-stream is assigned to one or more strings from the input dataset 104.

The updated graph data structures, clusters, and the attributes of the one or more nodes are stored. The stored structure facilitates navigating the input dataset 104 in a structured, and in turn, an efficient manner compared to the unstructured data prior to the grouping. The unstructured data in the input dataset 104 can include emails, text files, webpages and blog posts, social media sites, presentations, call transcripts, survey responses, publications, papers, and other such electronic data that is not stored in a structured manner. Once structured using embodiments of the present invention, the information from the unstructured input dataset 104 can be used as input data for machine learning applications such as for marketing intelligence, biomedical analysis, compliance analysis, and any other such functionality.

Embodiments of the present invention facilitate constructing graphs with attributes using various string analytics modules and applying clustering on the graphs to generate groupings of terms in an input dataset. A resulting group includes a group centroid term and all the terms that are similar, along with the attributes associated with each term.

The technical solutions provided by embodiments of the present invention include organizing unstructured text fields/terms in the input dataset using a list of strings/terms (e.g., classifications) to group the terms using a semantic model based on similarity as defined by the string of terms (e.g., domain-specific requirements). The technical solutions provided by embodiments of the present invention improve analytic data quality and reduce manual preprocessing for unstructured text fields/terms, and the results are organized to demonstrate similarities using graph data structures.

Figure 5:
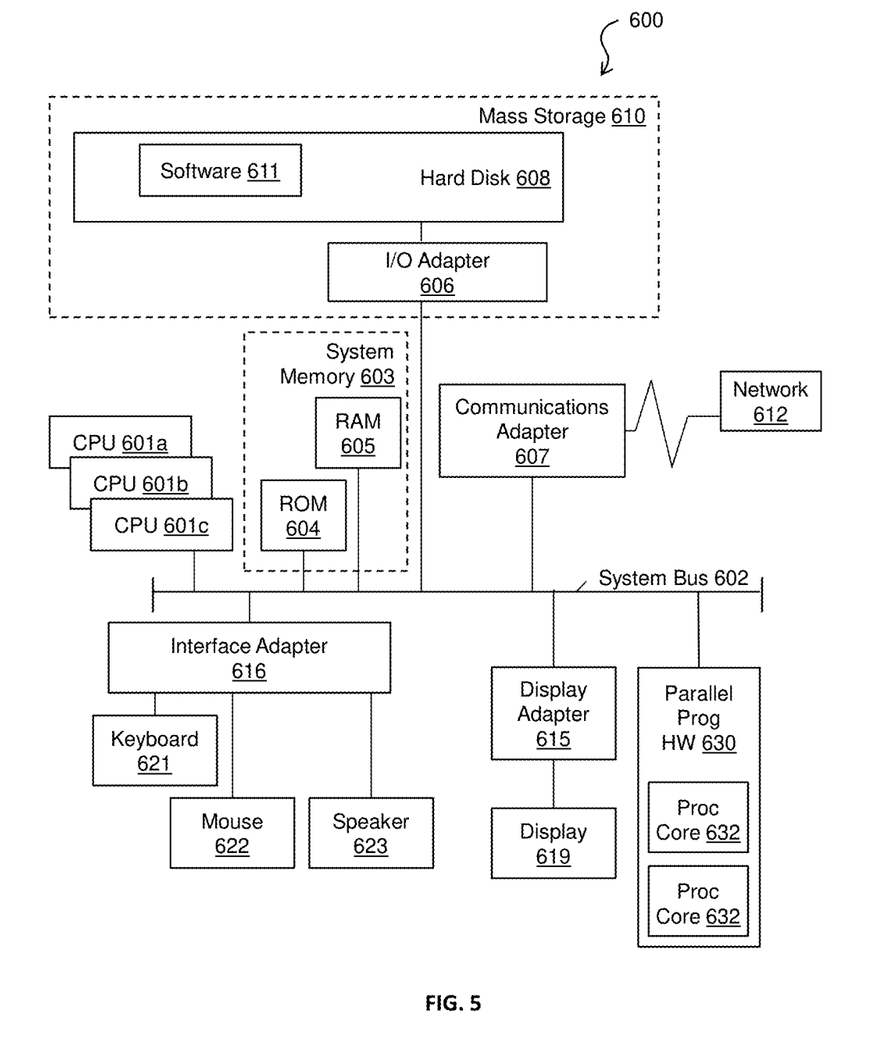
FIG. 5 depicts a computer system that implements one or more embodiments of the present invention.

Turning now to FIG. 5, a computer system 600 is generally shown in accordance with an embodiment. The computer system 600 can be used to implement one or more parallelized GBT implementations described herein. The computer system 600 can be an electronic computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 5, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read-only memory (ROM) 604 and a random-access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read-only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described hereinbelow with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 5.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics-intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 600 includes processing capability in the form of the processors 601, and storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external web server or a cloud computing node.

In some embodiments, the computing system 600 includes a parallel programmable hardware, such as a GPU, FPGA, or any other hardware component that includes one or more processor cores 632 that can execute thread groups in parallel. The CPU 601a, 601b, 601c can control the execution of the thread groups on the parallel programmable hardware 630. Alternatively, or in addition, the CPU 601a, 601b, 601c can execute one or more thread groups in conjunction with the parallel programmable hardware 630.

It is to be understood that the block diagram of FIG. 5 is not intended to indicate that the computer system 600 is to include all of the components shown in FIG. 5. Rather, the computer system 600 can include any appropriate fewer or additional components not illustrated in FIG. 5 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application-specific integrated circuit, among others), software (e.g., an application, among others), firmware, or any suitable combination of hardware, software, and firmware, in various embodiments.

In one or more embodiments of the present invention, the parallelized GBT implementation, and other machine learning techniques can be implemented using cloud computing. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 6:
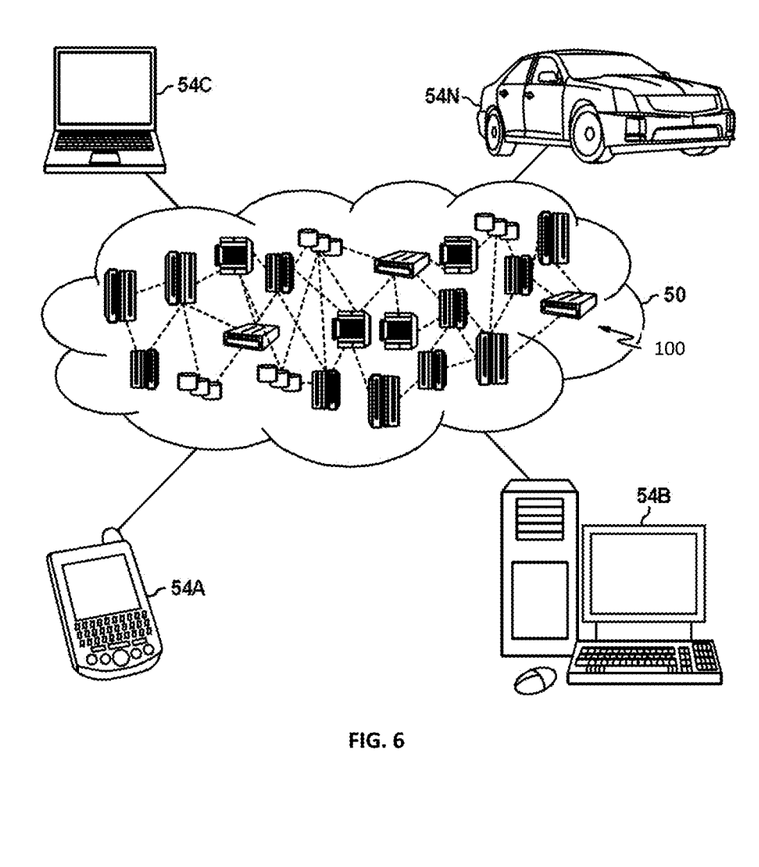
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
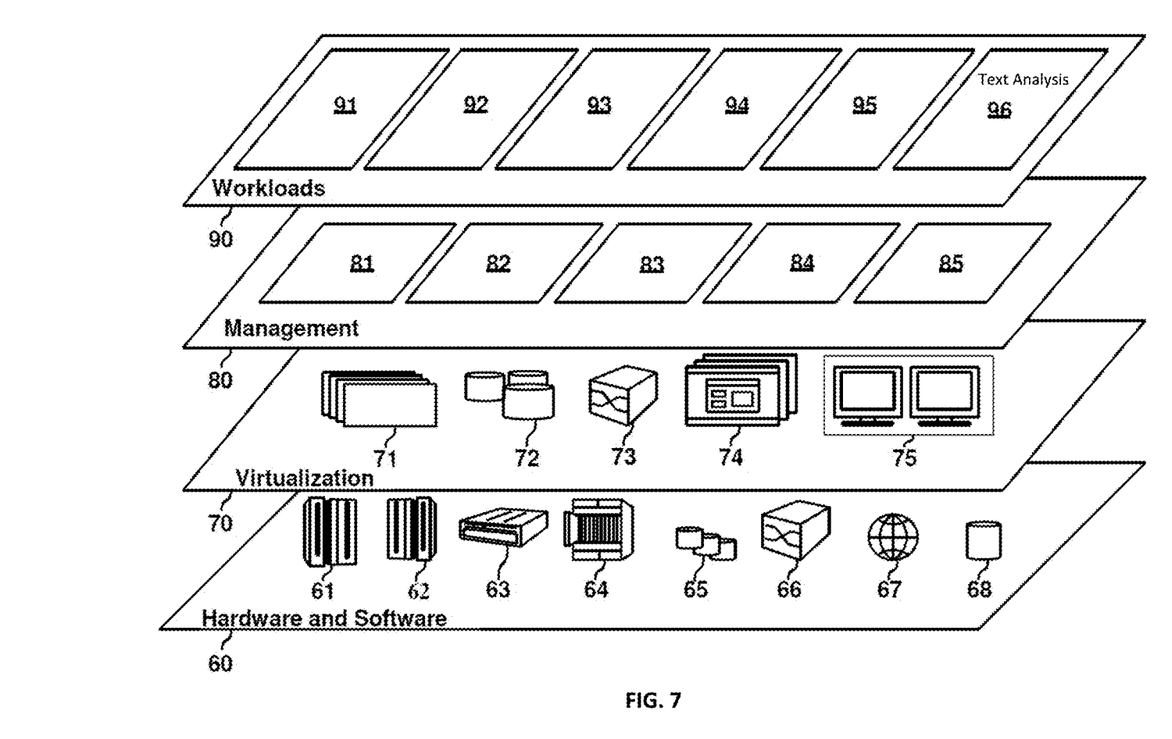
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning 96. The machine learning layer 96 can facilitate implementing text analysis according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order, or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer-readable storage medium (or media) having computer readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for converting unstructured computer text to domain-specific groups, the computer-implemented method comprising:
   determining a plurality of data-streams in an input text by parsing the input text;
   computing, for each pair of data-streams from the plurality of data-streams, a similarity score based on an input that identifies a domain of the input text;
   generating one or more graph data structures that comprise a plurality of nodes, each node representing a respective data-stream from the plurality of data-streams, and wherein the one or more graph data structures further comprise a plurality of edge, wherein an edge is added between a pair of nodes based on the similarity score of the corresponding pair of data-streams being above a first predetermined threshold;
associating each node with one or more attributes based on the data-stream corresponding to each node;
determining one or more clusters of nodes in the one or more graph data structures, wherein a cluster is determined by a clustering algorithm based on the one or more attributes of the nodes;
determining a centroid of each of the one or more clusters of nodes;
categorizing the clusters of nodes into one or more predetermined groups that are specific to the domain of the input text by categorizing the data-stream corresponding to the centroids of the respective clusters of nodes;
aggregating two or more clusters of nodes that are categorized into the same predetermined group in response to a similarity score of the centroids of the two or more clusters of nodes exceeding a second predetermined threshold; and
assigning each of the data-streams from the input text to a the one or more predetermined groups.

2. The computer-implemented method of claim 1, wherein the similarity score between two data-streams is determined based on syntactic information of the two data-streams.

3. The computer-implemented method of claim 1, wherein the similarity score between two data-streams is determined based on semantic information of the two data-streams.

4. The computer-implemented method of claim 3, wherein the semantic information of the two data-streams is determined using a semantic model that is specific to the domain of the input text.

5. The computer-implemented method of claim 1, further comprising determining a new centroid of a cluster that is created by combining the two or more clusters of nodes.

6. The computer-implemented method of claim 5, further comprising adding edges between the new centroid and other nodes from the cluster that is created by combining the two or more clusters of nodes.

7. The computer-implemented method of claim 1, further comprising using the data-streams from the input text that are structured according to the one or more of the predetermined groups for machine learning.

8. A system comprising:
a memory having computer-readable instructions; and
one or more processors for executing the computer-readable instructions, the computer-readable instructions controlling the one or more processors to perform a computer-implemented method comprising:
determining a plurality of data-streams in an input text by parsing the input text;
computing, for each pair of data-streams from the plurality of data-streams, a similarity score based on an input that identifies a domain of the input text;
generating one or more graph data structures that comprise a plurality of nodes, each node representing a respective data-stream from the plurality of data-streams, and wherein the one or more graph data structures further comprise a plurality of edge, wherein an edge is added between a pair of nodes based on the similarity score of the corresponding pair of data-streams being above a first predetermined threshold;
associating each node with one or more attributes based on the data-stream corresponding to each node;
determining one or more clusters of nodes in the one or more graph data structures, wherein a cluster is determined by a clustering algorithm based on the one or more attributes of the nodes;
determining a centroid of each of the one or more clusters of nodes;
categorizing the clusters of nodes into one or more predetermined groups that are specific to the domain of the input text by categorizing the data-stream corresponding to the centroids of the respective clusters of nodes;
aggregating two or more clusters of nodes that are categorized into the same predetermined group in response to a similarity score of the centroids of the two or more clusters of nodes exceeding a second predetermined threshold; and
assigning each of the data-streams from the input text to a the one or more predetermined groups.

9. The system of claim 8, wherein the similarity score between two data-streams is determined based on syntactic information of the two data-streams.

10. The system of claim 8, wherein the similarity score between two data-streams is determined based on semantic information of the two data-streams.

11. The system of claim 10, wherein the semantic information of the two data-streams is determined using a semantic model that is specific to the domain of the input text.

12. The system of claim 8, further comprising determining a new centroid of a cluster that is created by combining the two or more clusters of nodes.

13. The system of claim 12, further comprising adding edges between the new centroid and other nodes from the cluster that is created by combining the two or more clusters of nodes.

14. The system of claim 8, further comprising using the data-streams from the input text that are structured according to the one or more of the predetermined groups for machine learning.

15. A computer program product comprising a computer-readable storage medium having program instructions embodied therewith, the program instructions executable by one or more processors to cause the one or more processors to perform a method for converting unstructured computer text to domain-specific groups, the method comprising:
determining a plurality of data-streams in an input text by parsing the input text;
computing, for each pair of data-streams from the plurality of data-streams, a similarity score based on an input that identifies a domain of the input text;
generating one or more graph data structures that comprise a plurality of nodes, each node representing a respective data-stream from the plurality of data-streams, and wherein the one or more graph data structures further comprise a plurality of edge, wherein an edge is added between a pair of nodes based on the similarity score of the corresponding pair of data-streams being above a first predetermined threshold;
associating each node with one or more attributes based on the data-stream corresponding to each node;
determining one or more clusters of nodes in the one or more graph data structures, wherein a cluster is determined by a clustering algorithm based on the one or more attributes of the nodes;
determining a centroid of each of the one or more clusters of nodes;

categorizing the clusters of nodes into one or more predetermined groups that are specific to the domain of the input text by categorizing the data-stream corresponding to the centroids of the respective clusters of nodes;

aggregating two or more clusters of nodes that are categorized into the same predetermined group in response to a similarity score of the centroids of the two or more clusters of nodes exceeding a second predetermined threshold; and assigning each of the data-streams from the input text to a the one or more predetermined groups.

16. The computer program product of claim 15, wherein the similarity score between two data-streams is determined based on syntactic information of the two data-streams.

17. The computer program product of claim 15, wherein the similarity score between two data-streams is determined based on semantic information of the two data-streams.

18. The computer program product of claim 17, wherein the semantic information of the two data-streams is determined using a semantic model that is specific to the domain of the input text.

19. The computer program product of claim 15, further comprising determining a new centroid of a cluster that is created by combining the two or more clusters of nodes.

20. The computer program product of claim 19, further comprising adding edges between the new centroid and other nodes from the cluster that is created by combining the two or more clusters of nodes.

\* \* \* \* \*